United States Patent

Asada et al.

[11] Patent Number: 5,504,637
[45] Date of Patent: Apr. 2, 1996

[54] DISK ROTATING DEVICE HAVING DYNAMIC-PRESSURE FLUID BEARINGS

[75] Inventors: Takafumi Asada, Hirakata; Hiroaki Saito, Takatsuki, both of Japan

[73] Assignee: Matsushita Electric Industrial Co., Ltd., Osaka, Japan

[21] Appl. No.: 245,902

[22] Filed: May 19, 1994

[30] Foreign Application Priority Data

May 20, 1993 [JP] Japan .................................. 5-118178

[51] Int. Cl.$^6$ .................................................. G11B 17/08
[52] U.S. Cl. .................................. 360/98.07; 360/99.08; 384/107
[58] Field of Search ............................... 360/98.07, 99.04, 360/99.08, 99.12; 384/12, 107, 111–113, 228, 234, 440

[56] References Cited

U.S. PATENT DOCUMENTS

| | | | |
|---|---|---|---|
| 5,012,359 | 4/1991 | Kohno | 360/98.07 |
| 5,193,084 | 3/1993 | Christiaens | 360/99.08 |
| 5,210,665 | 5/1993 | Nishizawa | 360/99.01 |
| 5,291,358 | 3/1994 | Takahashi | 360/99.08 |
| 5,328,271 | 7/1994 | Titcomb | 360/99.12 |

FOREIGN PATENT DOCUMENTS 62-40662  2/1987  Japan .
62-21190  5/1987  Japan .

OTHER PUBLICATIONS

Article of Nikkei Sangyo Shinbun (Nikkei Industrial News), Apr. 22, 1993.

Primary Examiner—A. J. Heinz
Attorney, Agent, or Firm—Wenderoth, Lind & Ponack

[57] ABSTRACT

A disk rotating device includes a stationary shaft having one end fixed to a casing, a minor shaft having one end fixed to the casing, a flange member located on one end face of the stationary shaft and being in contact with a contact portion of the minor shaft, a rotary member rotatably mounted around the stationary shaft and supporting a disk, a thrust plate fixed in the vicinity of an end face of the rotary member and being in contact with the flange member, and a motor having a motor stator provided in the casing and a motor rotor provided in the rotary member so as to rotate the disk together with the rotary member around the stationary shaft. A radial bearing groove is provided on at least one of an outer circumferential surface of the stationary shaft and an inner circumferential surface of the sleeve. An outer thrust bearing groove is provided on a surface of at least one of the flange member and the thrust plate, at which the flange member and the thrust plate are in contact with each other. These grooves have lubricant retained therein.

20 Claims, 5 Drawing Sheets

DISK ROTATING DEVICE HAVING DYNAMIC-PRESSURE FLUID BEARINGS

BACKGROUND OF THE INVENTION

The present invention relates to a disk rotating device using dynamic-pressure type fluid bearings, for use in a disk recording apparatus which performs the recording and reproduction of signals from a rotating magnetic disk or the like.

In recent years, recording apparatus using disks and the like have increased in memory capacity and data transfer speed. This, in turn, has required disk rotating devices used in such recording devices to be capable of high-speed, high-precision rotations. As a result, disk rotating devices in which a central shaft is supported at its both ends, such as disclosed in Japanese Patent Publication No. 62-21190 and Japanese Laid-Open Patent Publication No. 62-40662, are used in disk drives.

Referring now to the drawings, examples of the above-described conventional disk drives are described. FIGS. 6, 7, and 8 show sectional views of conventional disk drives. In a first conventional example as shown in FIG. 6, there are shown a casing 21, a shaft 22 whose both ends are fixed, ball bearings 23A, 23B, and a hub 24 rotatably attached to the shaft 22 via the ball bearings 23A, 23B. A motor stator 25 is secured to the casing 21, and a motor rotor 26 is secured to the hub 24. The hub 24 is shaped into such a configuration that disks 28A, 28B, 28C and spacers 29A, 29B can be attached thereto. Reference numeral 27 denotes a top cover.

Regarding the first conventional disk rotating device having the above arrangement, its operation is described below. First, when the motor stator 25 is electrically energized, a rotating magnetic field is generated, and then the motor rotor 26 drives the hub 24 into rotation. Then the hub 24 rotates while being supported by the ball bearings 23A, 23B.

On the other hand, FIGS. 7 and 8 show sectional views of a second conventional disk rotating device. In the figures, there are shown a casing 31, a top cover 42, bearing housings 34A, 34B, a rotatable shaft 32, flanges 33A, 33B secured to both ends of the shaft 32, and bearing covers 35A, 35B. Radial bearing grooves 36A, 36B are formed on outer circumferential surfaces of the flanges 33A, 33B, respectively. Further, thrust bearing grooves 37A, 37B are formed on surfaces of the flanges 33A, 33B in contact with the bearing housings 34A, 34B, respectively. These grooves have lubricant 38A, 38B, respectively, retained therein. A hub 39 and a motor rotor 41 are secured to the shaft 32, and a motor stator 40 is attached to the casing 31. The hub 39 is shaped into such a configuration that disks 43A, 43B, 43C and spacers 44A, 44B can be attached thereto.

In this second conventional example, when the motor stator 40 is electrically energized, a rotating magnetic field develops so that the motor rotor 41 is driven to rotate together with the hub 39 and the shaft 32. When this occurs, the radial bearing grooves 36A, 36B and the thrust bearing grooves 37A, 37B pump the lubricant 38A, 38B, respectively, to generate a pressure and generate a floating force, thus making non-contact rotation.

The above-described arrangements, however, have the following disadvantages. In the first conventional example of FIG. 6, in which ball bearings are used, rolling vibrations generated by the ball bearings 23A, 23B during rotation are transferred to the casing 21, the top cover 27, and an unshown magnetic head. As a result, there would be some cases where the recording and reproduction of signals with the disks 28a, 28B, 28C could not be accomplished.

In the second conventional example of FIGS. 7 and 8, in which fluid bearings are used, vibrations from the bearings will not be generated, but the diameter of the radial bearing grooves 36A, 36B is large. As a result, there would be disadvantages such as a large friction loss of the bearings and a large power consumption of the motor. Further, another disadvantage that is assembling accuracy cannot be easily achieved.

SUMMARY OF THE INVENTION

Overcoming the above disadvantages of the prior art are objects of the present invention.

In accomplishing these and other objects, according to one aspect of the present invention, there is provided a disk rotating device comprising: a stationary shaft one end of which is fixed to a casing; a minor shaft one end of which is fixed to the casing; a flange member located on one end face of the stationary shaft and being in contact with a contact portion of the minor shaft; a rotary member rotatably mounted around the stationary shaft and supporting a disk; a thrust plate fixed in the vicinity of an end face of the rotary member and being in contact with the flange member; and a motor having a motor stator provided in the casing and a motor rotor provided in the rotary member so as to rotate the disk together with the rotary member around the stationary shaft. A radial bearing groove is provided on at least one of an outer circumferential surface of the stationary shaft and an inner circumferential surface of the sleeve. An outer thrust bearing groove is provided on a surface of at least one of the flange member and the thrust plate, at which the flange member and the thrust plate are in contact with each other. These grooves have lubricant retained therein.

According to another aspect of the present invention, there is provided a disk rotating device comprising a stationary shaft one end of which is fixed to a casing; a minor shaft one end of which is fixed to the casing; a flange member located on one end face of the stationary shaft and being in contact with a contact portion of the minor shaft; a rotary member rotatably mounted around the stationary shaft and supporting a disk; a thrust plate fixed in the vicinity of an end face of the rotary member and being in contact with the flange member; and a motor having a motor stator provided in the casing and a motor rotor provided in the rotary member so as to rotate the disk together with the rotary member around the stationary shaft. A radial bearing groove is provided on at least one of an outer circumferential surface of the stationary shaft and an inner circumferential surface of the sleeve. A inner thrust bearing groove is provided on a surface of at least one of the flange member and a surface of the rotary member which faces to the flange member, at which the flange member and the surface of the rotary member are in contact with each other. These grooves have lubricant retained therein.

With the above arrangement, the disk rotating device of the present invention is capable of high-precision rotation without involving rolling vibrations of ball bearings, so that friction torque is small and high assembling accuracy can be obtained.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
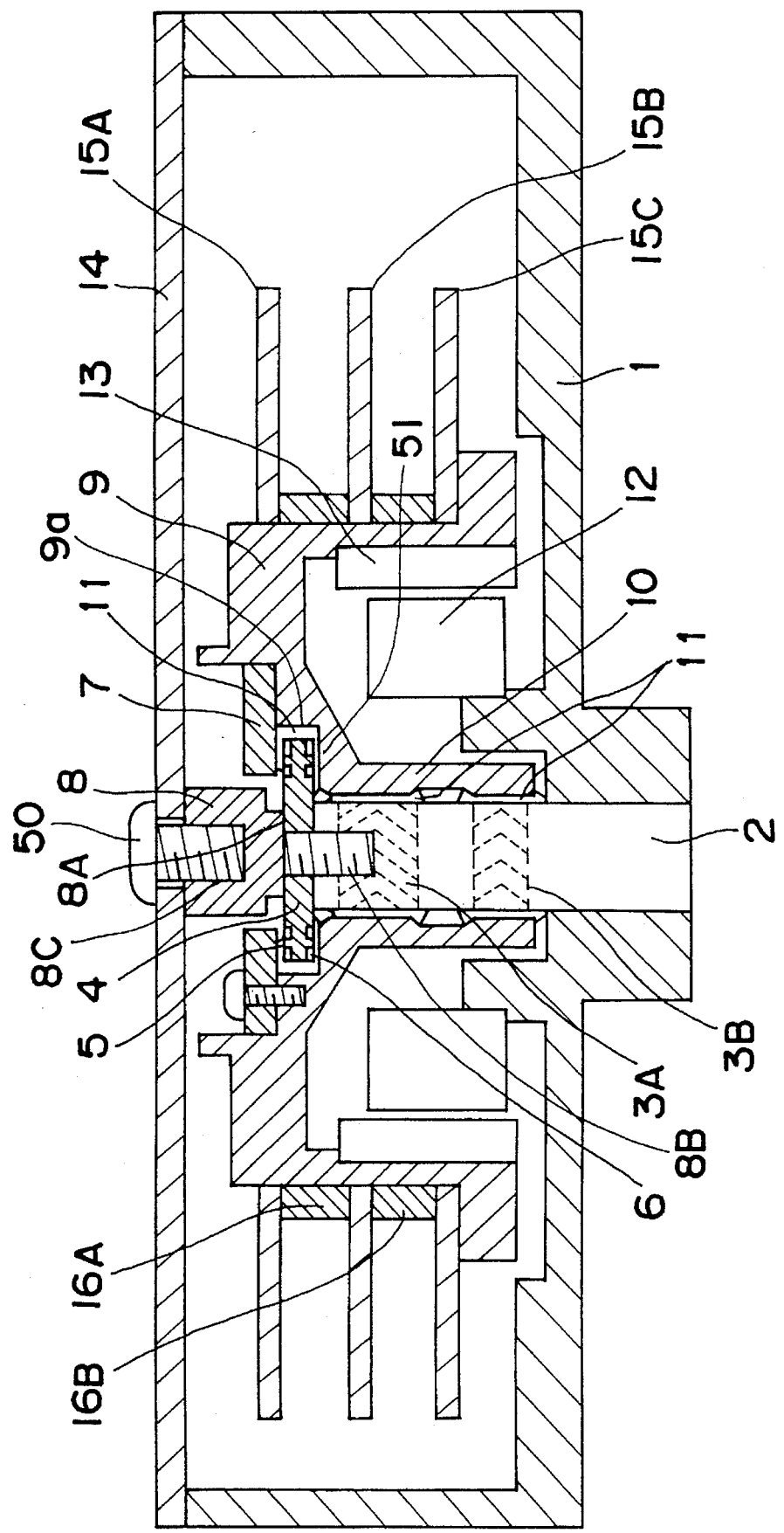
FIG. 1 is a sectional view of a disk rotating device of a first embodiment according to the present invention.

Before the description of the present invention proceeds it is to be noted that like parts are designated by like reference numerals throughout the accompanying drawings.

Figure 2:
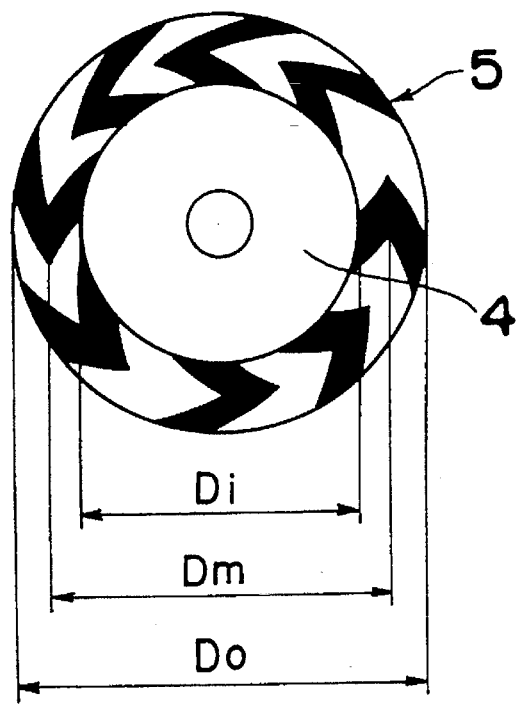
FIG. 2 is a detailed view of the outer thrust bearing groove in FIG. 1.
Figure 3:
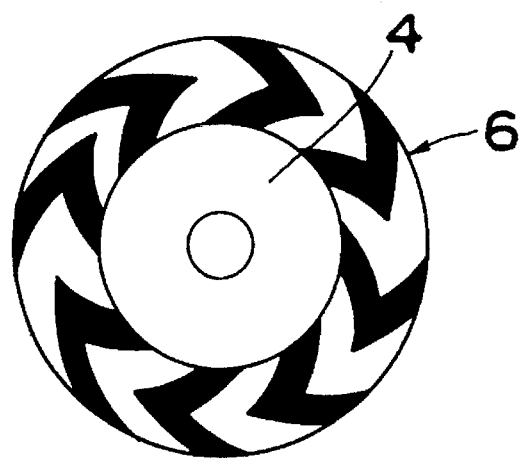
FIG. 3 is a detailed view of the inner thrust bearing groove in FIG. 1.

Now disk rotating devices of embodiments according to the present invention are described with reference to FIGS. 1 to 5. FIGS. 1 to 3 illustrate a first embodiment of the present invention. Referring to FIG. 1, the lower end of a stationary shaft 2 is fixed to a lower casing 1. To the stationary shaft 2, a sleeve 10 integrated with a hub 9 for fixing disks 15A, 15B, 15C and spacers 16A, 16B is rotatably fitted. On an end face of the stationary shaft 2 on its free end side, a threaded portion 8B of a minor shaft 8 is screwed through a flange member 4. The minor shaft 8 is fixed to an upper casing 14 by screwing a fixing element 50 of screw or the like into a threaded hole 8C of the minor shaft 8 through the upper casing 14. Thus, the flange member 4 is urged by a contact portion 8A of a minor shaft 8 against the end face of the stationary shaft 2, and the flange member 4 is fixed between the minor shaft 8 and the stationary shaft 2. The contact portion 8A of the minor shaft 8 has a smaller diameter than that of the stationary shaft 2. The flange member 4 is housed in a recessed portion 9a of the hub 9. A thrust plate 7 in contact with a surface of the flange member 4 on the minor shaft side is secured to the hub 9. On either one of the outer circumferential surface of the stationary shaft 2 or the inner circumferential surface of the sleeve 10, there are provided at least two sets of radial bearing grooves 3A, 3B of, for example, of a herringbone shape. On the contact surface of either one of the flange member 4 or the thrust plate 7, there are provided outer thrust bearing grooves 5 of a herringbone shape as shown in FIG. 2. Further, on either one of the end face 51 of the sleeve 10 or the contact surface of the flange member 4, there are provided inner thrust bearing grooves 6 as shown in FIG. 3. In FIG. 1, the outer thrust bearing grooves 5 are provided on the contact surface of the flange member 4 which faces the contact surface of the thrust plate 7, and the inner thrust bearing grooves 6 are provided on the contact surface of the flange member 4 which faces the end face 51 of the sleeve 10. These grooves 3A, 3B, 5, 6 are fed with lubricant 11. A motor rotor 13 of a motor is secured to the hub 9, a motor stator 12 of the motor is secured to the lower casing 1, and the upper casing 14 is attached to the lower casing 1.

The disk rotating device having the abovedescribed arrangement is now explained in its operation with reference to FIGS. 1 to 3. Referring to FIG. 1, when the motor stator 12 is electrically energized, causing a rotating magnetic field to be developed, the motor rotor 13 begins to rotate together with the hub 9, the sleeve 10, the thrust plate 7, the disks 15, and the spacers 16. When this occurs, the radial bearing grooves 3A, 3B collect the lubricant 11 to generate a pressure by pumping action. Meanwhile, the outer thrust bearing grooves 5 and the inner thrust bearing grooves 6 also collect the lubricant 11. Thus, these pressures generated bring the rotating members into a completely non-contact state.

As described above, according to the first embodiment, since no ball bearings are employed, no rolling vibrations occur, so that high-density recording and reproduction can be implemented between the disks 15A, 15B, 15C and an unshown magnetic head. Further, radial bearings can be provided at a small diameter, so that less frictional-loss of torque occurs in the of bearings. Besides, whereas this type of fluid bearing necessitates high assembling accuracy, the construction of the first embodiment features the fact that, if the free-end side end face of the stationary shaft 2 is previously processed to be at a right angle to its axis with high precision, the flange member 4 is urged against this end face at the small-diameter contact portion 8A by the fixing element 50 so that the flange member 4 can be attached into close contact and therefore assembled properly at right angles against the stationary shaft 2. That is, since the diameter of the contact portion 8A of the minor shaft 8 is smaller than that of the stationary shaft 2, the area where a pressure applied to the end face of the stationary shaft 2 via the flange member 4 by the contact portion 8A of the minor shaft 8 becomes small, so that the flange member 4 can be easily attached into close contact and therefore assembled with proper right angles against the stationary shaft 2. Moreover, in the first embodiment of FIG. 1, since two bearing grooves 5, 6 are provided in the thrust direction, the bearings can be maintained in non-contact rotation even if an impact load is applied in any direction.

Figure 4:
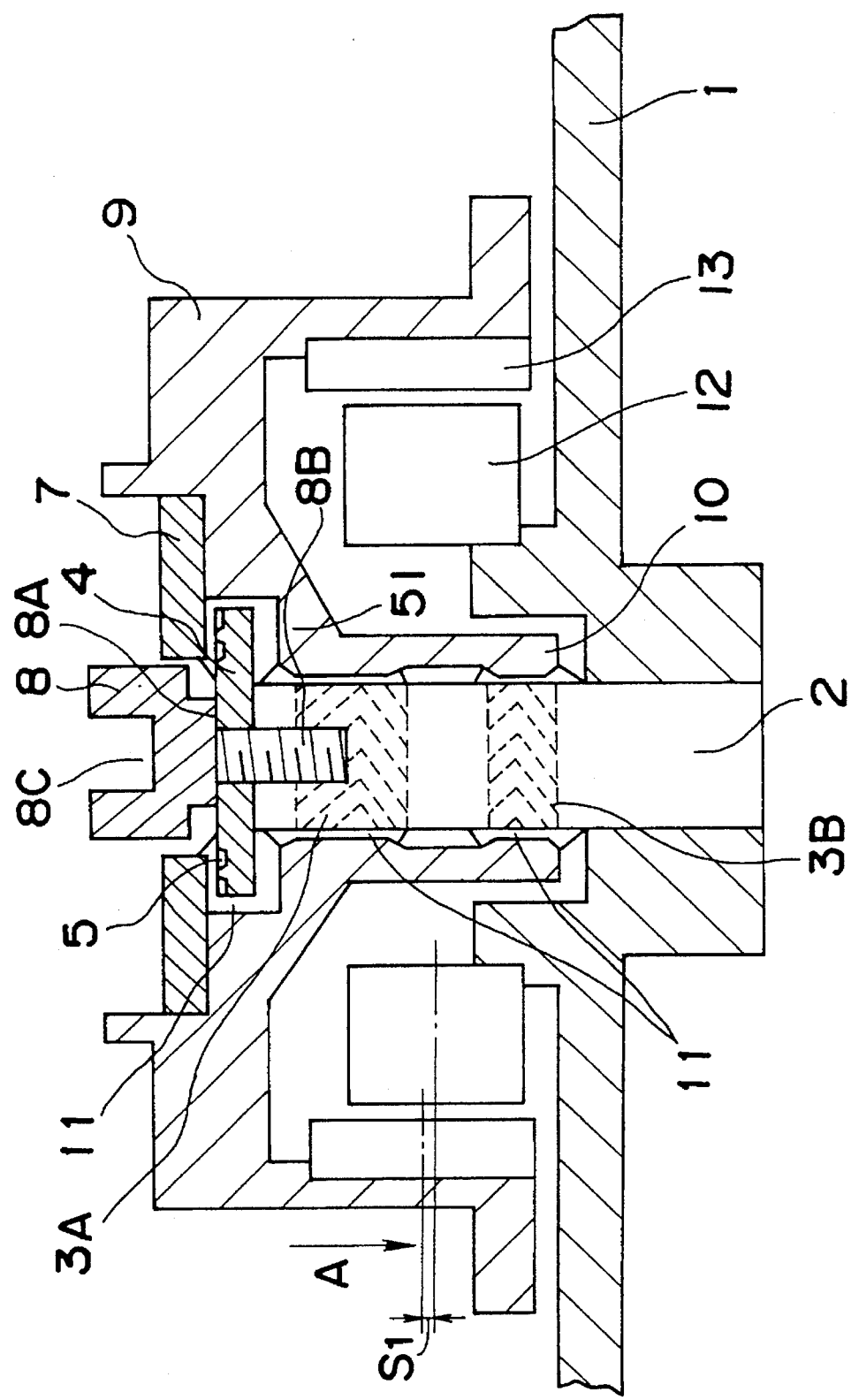
FIG. 4 is a sectional view of a second embodiment of the present invention.

FIG. 4 shows a second embodiment of the present invention. In this embodiment, while the outer thrust bearing groove 5 is provided on the contact surface of either one of the flange member 4 or the thrust plate 7, no bearing groove is provided on the contact surface against the sleeve 10. In this case, since the center of the motor rotor 13 is shifted by a predetermined distance $S_1$ of, for example, 1 mm with respect to the center of the motor stator 12 in a direction opposite to a direction in which the flange member 4 moves toward contact with the thrust plate 7, the motor rotor 13 tends to move to align its center with the center of the motor stator 12 and thus the motor rotor 13 generates a force in the direction of arrow A in FIG. 4. Then, the lower contact surface of the thrust plate 7 moves toward contact with the upper contact surface of the flange member 4 to effectively serve the function as the thrust bearing.

Figure 5:
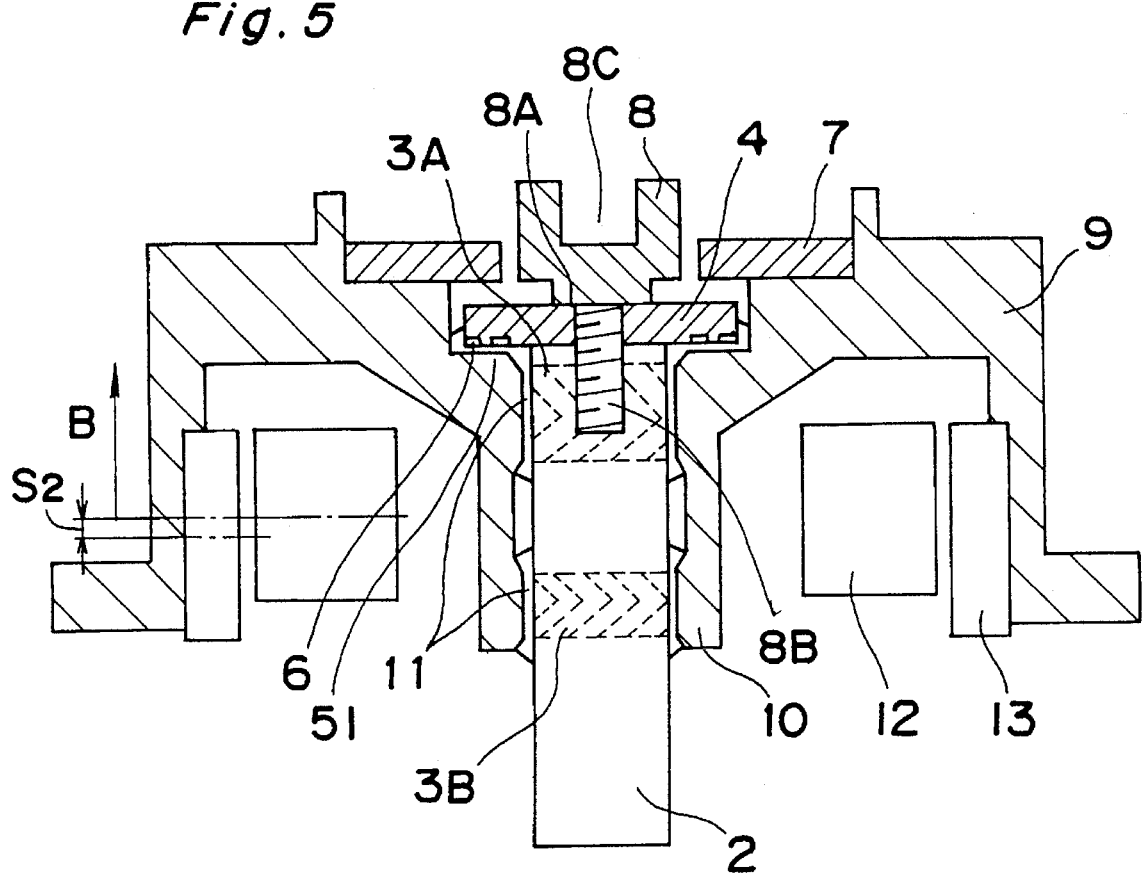
FIG. 5 is a sectional view of a third embodiment of the present invention.
Figure 6:
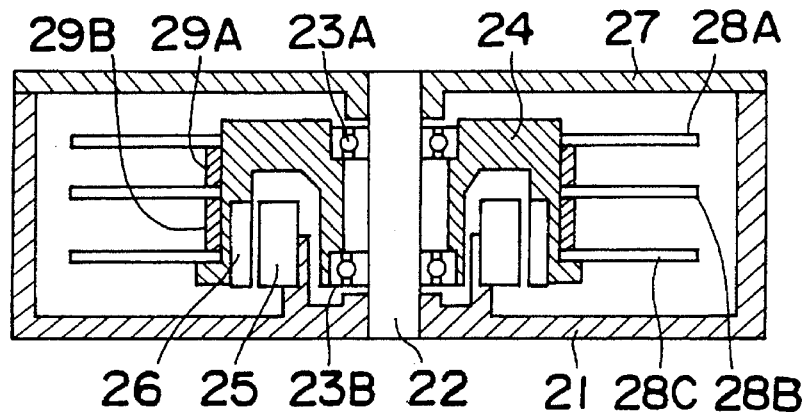
FIG. 6 is a sectional view of a first example of the conventional disk rotating device.
Figure 7:
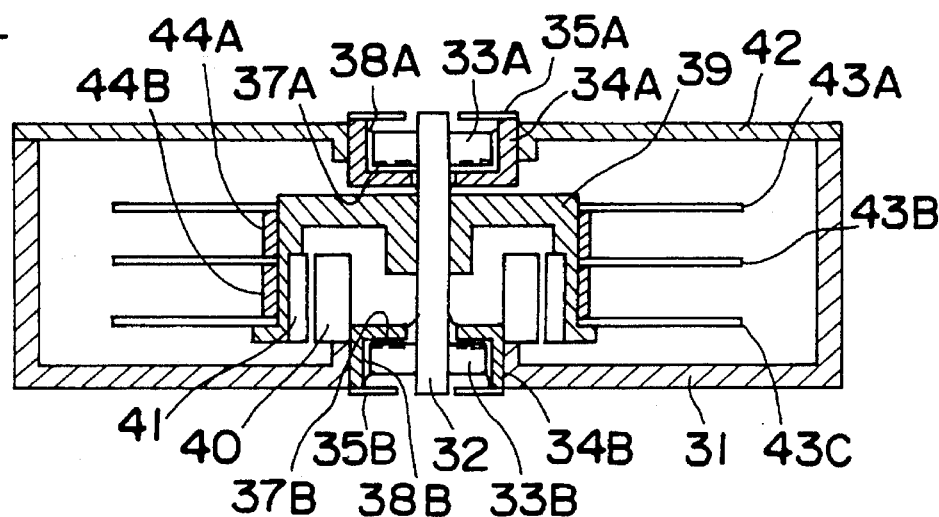
FIG. 7 is a sectional view of a second example of the conventional disk rotating device.
Figure 8:
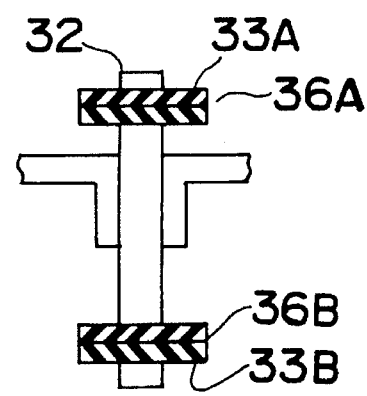
FIG. 8 is a detailed view of the radial bearing groove in FIG. 7.

FIG. 5 shows a third embodiment of the present invention. In this embodiment, while the inner thrust bearing groove 6 is provided on the contact surface of either one of the flange member 4 or the sleeve 10, no bearing groove is provided on the contact surface against the thrust plate 7. In this case, since the center of the motor rotor 13 is shifted by a predetermined distance $S_2$ of, for example, 1 mm with respect to the center of the motor stator 13 in a direction in which the flange member 4 moves toward contact with the end face 51 of the sleeve 10, the motor rotor 13 tends to move to align its center with the center of the motor stator 12 and thus the motor rotor 13 generates a suction force in the direction of arrow B in FIG. 5. Then, the upper end face 51 of the sleeve 10 moves toward contact with the lower contact surface of the flange member 4 to effectively serve the function as the thrust bearing.

In the cases of the second and third embodiments of FIGS. 4 and 5, since only one thrust bearing groove is provided, less frictional-loss of torque occurs in the bearings as compared to a case where two thrust bearing grooves are provided.

In addition, in FIGS. 1, 4, and 5, two herringbone-shaped radial bearing grooves 3A, 3B are so arranged that one of them 3A on the flange member 4 side is longer in axial length than the other one 3B. The reason is that since unbalanced loads generated by rotation of the disks 15A, 15B, 15C apply more to the radial bearing groove 3A on the flange member side and less to the other radial bearing groove 3B, frictional-loss of torque can be minimized while two radial bearing grooves 3A, 3B are subject to substantial load.

It is noted that the lubricant 11 is composed of 90% or more of ester oil and the remaining 5% or less of mineral oil, olefin, hydrocarbon, and the like. This is because whereas the fluid bearings of the disk rotating device must not allow oil to scatter or flow out from the bearings in the form of mist, ester-series lubricating oils are at an extremely low level in mist generation because of high surface tension and wettability, as compared with lubricating oils of equivalent viscosity. Oil mist is less generated in the order of ester oils<olefin oils<fluoro oils<silicone oils, according to experiments. Use of ester oils by 90% or more of the components makes it possible to obtain a disk rotating device free from generation of oil mist. Moreover, as shown in FIG. 2, when an outer diameter of the thrust bearing groove is $D_O$, a center diameter of the pattern of the thrust bearing groove is $D_m$, and an inner diameter of the thrust bearing groove is $D_i$, the pattern of the thrust bearing groove can be shaped into a configuration which satisfies the following expression:

$$D_m < \sqrt{(D_0^2 + D_i^2)/2}.$$

Thus, such a configuration can prevent a centrifugal force caused in the bearing from allowing the lubricant 11 to fly or flow out and the durability can be improved.

As described above, according to the present invention, a flange member is secured to an end face of a stationary shaft by means of the stationary shaft and a minor shaft, and moreover a rotary member such as a rotatable sleeve and a hub integrated therewith is rotatably provided to the stationary shaft. By this arrangement, no rolling vibration occurs, and thus a disk rotating device can be obtained which is high in rotating accuracy, small in frictional-loss of torque in the bearings, and good in assembling accuracy.

Although the present invention has been fully described in connection with the preferred embodiments there of with reference to the accompanying drawings, it is to be noted here that various changes and modifications will be apparent to those skilled in the art. Such changes and modifications are to be understood as included within the scope of the present invention as defined by the appended claims unless they depart therefrom.

What is claimed is:

1. A disk rotating device comprising:

a casing;

a stationary shaft fixed to said casing and having first and second end portions;

a flange member located on an end face of said first end portion of said stationary shaft;

a minor shaft fixed to said casing and having an end defining a contact portion contacting said flange member;

a rotary member rotatably mounted around said stationary shaft and supporting a disk;

a thrust plate fixed to said rotary member and bearing against said flange member; and a motor having a motor stator mounted to said casing and a motor rotor mounted to said rotary member so as to rotate the disk together with said rotary member around said stationary shaft;

wherein said contact portion of said minor shaft has a diameter smaller than a diameter of said first end portion of said stationary shaft;

wherein a radial bearing groove is provided on at least one of an outer circumferential surface of said stationary shaft and an inner circumferential surface of said rotary member, an outer thrust bearing groove is provided on a surface of at least one of said flange member and said thrust plate at which said flange member and said thrust plate bear against one another, and each of said radial bearing groove and said outer thrust bearing groove has bearing lubricant retained therein.

2. The disk rotating device as claimed in claim 1, wherein an inner thrust bearing groove is provided on a surface of at least one of said flange member and said rotary member at which said flange member and said rotary member bear against one another.

3. The disk rotating device as claimed in claim 2, further comprising a fixing element fixing said minor shaft to said casing;

wherein said minor shaft comprises a fixing element fixing said flange member to said stationary shaft; and wherein when an outer diameter of the thrust bearing groove is $D_0$, a center diameter of a pattern of the thrust bearing groove is $D_m$, and an inner diameter of the thrust bearing groove is $D_i$, the pattern of the thrust bearing groove is shaped into a configuration which satisfies the following expression:

$$D_m < \sqrt{(D_0^2 + D_i^2)/2}.$$

4. The disk rotating device as claimed in claim 3, wherein another radial bearing groove is provided on at least one of the outer circumferential surface of said stationary shaft and the inner circumferential surface of said rotary member, the two radial bearing grooves are herringbone grooves, one of said herringbone grooves on the flange side is longer than the other of said herringbone grooves, and the lubricant retained in the grooves is composed of 90% or more ester oil.

5. The disk rotating device as claimed in claim 3, wherein a center, along an axial direction, of said rotor is shifted by a predetermined distance with respect to a center, along an axial direction, of said stator in a direction opposite to a direction in which said flange member moves toward contact with said thrust plate, and said center of said rotor is shifted by a predetermined distance with respect to said center of said stator in a direction in which the flange member moves toward contact with said rotary member.

6. The disk rotating device as claimed in claim 2, wherein a center, along an axial direction, of said rotor is shifted by a predetermined distance with respect to a center, along an axial direction, of said stator in a direction in which said flange member moves toward contact with said rotary member.

7. The disk rotating device as claimed in claim 2, wherein a center, along an axial direction, of said rotor is shifted by a predetermined distance with respect to a center, along an axial direction, of said stator in a direction opposite to a direction in which said flange member moves toward contact with said thrust plate, and said center of said rotor is shifted by a predetermined distance with respect to said center of said stator in a direction in which the flange member moves toward contact with said rotary member.

8. The disk rotating device as claimed in claim 1, wherein said minor shaft comprises a fixing element fixing said flange member to said stationary shaft.

9. The disk rotating device as claimed in claim 1, further comprising a fixing element fixing said minor shaft to said casing.

10. The disk rotating device as claimed in claim 1, wherein when an outer diameter of the thrust bearing groove is $D_0$, a center diameter of a pattern of the thrust bearing groove is $D_m$, and an inner diameter of the thrust bearing groove is $D_i$, the pattern of the thrust bearing groove is shaped into a configuration which satisfies the following expression:

$$D_m < \sqrt{(D_0^2 + D_i^2)/2}\ .$$

11. The disk rotating device as claimed in claim 1, wherein another radial bearing groove is provided on at least one of the outer circumferential surface of said stationary shaft and the inner circumferential surface of said rotary member, the two radial bearing grooves are herringbone grooves, and one of said herringbone grooves on the flange side is longer than the other of said herringbone grooves.

12. The disk rotating device as claimed in claim 1, wherein the lubricant retained in the grooves is composed of 90% or more ester oil.

13. The disk rotating device as claimed in claim 1, wherein a center, along an axial direction, of said rotor is shifted by a predetermined distance with respect to a center, along an axial direction, of said stator in a direction opposite to a direction in which said flange member moves toward contact with said thrust plate.

14. A disk rotating device comprising:

a casing;

a stationary shaft fixed to said casing and having first and second end portions;

a flange member located on an end face of said first end portion of said stationary shaft;

a minor shaft fixed to said casing and having an end defining a contact portions contacting said flange member;

a rotary member rotatably mounted around said stationary shaft and supporting a disk;

a thrust plate fixed to said rotary member and bearing against said flange member; and a motor having a motor stator mounted to said casing and a motor rotor mounted to said rotary member so as to rotate the disk together with said rotary member around said stationary shaft, wherein said contact portions of said minor shaft has a diameter smaller than a diameter of said first end portion of said stationary shaft;

wherein a radial bearing groove is provided on at least one of an outer circumferential surface of said stationary shaft and an inner circumferential surface of said rotary member, and an inner thrust bearing groove is provided on a surface of at least one of said flange member and said rotary member at which said flange member and said rotary member bear against one another, and each of said radial bearing groove and said inner thrust bearing groove has bearing lubricant retained therein.

15. The disk rotating device as claimed in claim 14, wherein said minor shaft comprises a fixing element fixing said flange member to said stationary shaft.

16. The disk rotating device as claimed in claim 14, further comprising a fixing element fixing said minor shaft to said casing.

17. The disk rotating device as claimed in claim 14, wherein when an outer diameter of the thrust bearing groove is $D_0$, a center diameter of a pattern of the thrust bearing groove is $D_m$, and an inner diameter of the thrust bearing groove is $D_i$, the pattern of the thrust bearing groove is shaped into a configuration which satisfies the following expression:

$$D_m < \sqrt{(D_0^2 + D_i^2)/2}\ .$$

18. The disk rotating device as claimed in claim 14, wherein another radial bearing groove is provided on at least one of the outer circumferential surface of said stationary shaft and the inner circumferential surface of said rotary member, the two radial bearing grooves are herringbone grooves, and one of said herringbone grooves on the flange side is longer than the other of said herringbone grooves.

19. The disk rotating device as claimed in claim 14, wherein the lubricant retained in the grooves is composed of 90% or more ester oil.

20. The disk rotating device as claimed in claim 14, wherein when an outer diameter of the thrust bearing groove is $D_0$, a center diameter of a pattern of the thrust bearing groove is $D_m$, and an inner diameter of the thrust bearing groove is $D_i$, the pattern of the thrust bearing groove is shaped into a configuration which satisfies the following expression:

$$D_m < \sqrt{(D_0^2 + D_i^2)/2}\ ;$$

wherein the lubricant retained in the grooves is composed of 90% or more ester oil.

* * * * *